United States Patent [19]
Biscardi et al.

[11] 3,810,995
[45] May 14, 1974

[54] CENTRAL NERVOUS SYSTEM STIMULATION

[75] Inventors: Salvatore F. Biscardi, Cornwall; Benjamin R. Zeitlin, Suffern, both of N.Y.

[73] Assignee: General Foods Corporation, White Plains, N.Y.

[22] Filed: Mar. 31, 1972

[21] Appl. No.: 240,270

[52] U.S. Cl.............................. 424/331, 424/343
[51] Int. Cl............................................ A61k 27/00
[58] Field of Search........................... 424/343, 331

[56] References Cited
OTHER PUBLICATIONS
Chem. Abst. (1), 28–28453 (1934).
Chem. Abst. (2), 49–11091G (1955).

Primary Examiner—Stanley J. Friedman
Attorney, Agent, or Firm—Bruno P. Struzzi; Daniel J. Donovan; William J. Speranza

[57] ABSTRACT

A mixture of l-carvone and cis-carveol has been found to produce central nervous system (CNS) stimulatory effects when ingested. The mixture is effective at low levels and, therefore, may be incorporated into a variety of foodstuffs without imparting any undesirable off-flavors.

6 Claims, No Drawings

CENTRAL NERVOUS SYSTEM STIMULATION

BACKGROUND OF THE INVENTION

This invention relates to food additives and more particularly to a mixture of food additives capable of producing central nervous system stimulatory effects. This application is related to our application entitled CENTRAL NERVOUS SYSTEM STIMULATION, our Case No. 1943, filed concurrently with this application.

Generally, central nervous system stimulation is characterized by the diminished drowsiness, diminished psychic fatigue, facilitated mental and muscular efforts, increased arousal and awareness, the production of more sustained intellectual effort, and the promotion of a feeling of well-being realized in the subject. It is desirable, of course, to use such a stimulant in conjunction with a foodstuff. Coffee, inherently containing amounts of caffeine, and cola beverages using caffeine as an additive are examples of such foodstuffs.

The desirability of a foodstuff possessing central nervous system stimulation ability, however, is offset or balanced against a combination of factors. The use of caffeine in foods is regulated to incorporation only in cola beverages and, hence, other stimulants must be found in order to provide a wider variety of food products possessing central nervous system stimulatory effects. Other food additives possessing CNS stimulatory effects but not so regulated to a narrow range of foodstuffs have been discovered, but generally their effectiveness as stimulants is realized only when used at disproportionately high levels resulting in the unacceptable taste of food products containing them. L-carvone, for example, a major component of spearmint oil has been reported as possessing central nervous system stimulating effects (A Manual of Pharmacology by Sollman, page 166.). However, the spearmint flavor imparted by l-carvone at levels effective for producing optimum stimulation effects is undesirable in products such as snacks, cereals, beverages, and the like, resulting in a rather limited use of such additives. Further, other additives possess central nervous system stimulation ability only in a narrow dose range, and, therefore, present problems in effective control of manufacturing procedures to obtain the desired stimulation in a foodstuff.

Accordingly, it is an object of this invention to prepare a food additive capable of effecting central nervous system stimulation, and which is effective at acceptable food additive levels and thereby may be used in a variety of foodstuffs.

Another object of this invention is to prepare foodstuffs possessing desirable stimulatory effects when ingested.

These and other objects will become more apparent upon reading the specification and claims which follow.

SUMMARY OF THE INVENTION

It has been found in accordance with this invention that a mixture of l-carvone and cis-carveol, components of spearmint oil, is an effective central nervous system stimulant. The mixture is effective at low levels of addition to foodstuffs by virtue of a synergistic effect between the two components allowing each to be used effectively at lower levels than if used independently. This synergism allows the mixture to be used at levels compatible with other ingredients in a wide variety of foodstuffs without imparting any undesirable off-flavors.

DETAILED DESCRIPTION OF THE INVENTION

L-carvone and cis-carveol are components of spearmint oil and generally present in amounts of about 70% l-carvone and 0.2% cis-carveol. It has been found that a mixture of these two components in certain ratios results in a composition having central nervous system stimulatory ability when administered even at low levels.

L-carvone and cis-carveol belong to the terpene groups of the cyclohexene, monoterpenoid type with the formula $C_{10}H_{16}$. Their structural formulas are as follows:

l-Carvone:

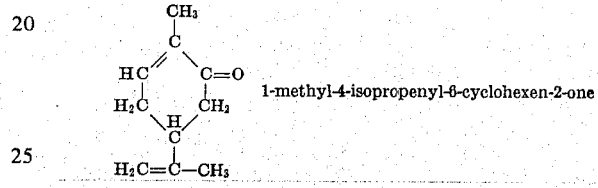

1-methyl-4-isopropenyl-6-cyclohexen-2-one cis-Carveol:

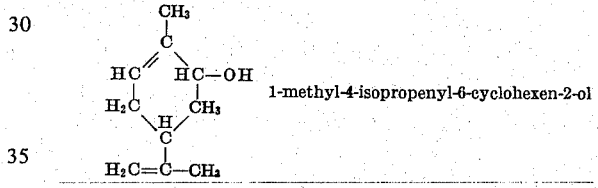

1-methyl-4-isopropenyl-6-cyclohexen-2-ol

The flavor characteristics imparted by the above compounds are generally of the spearmint or caraway type.

Characteristics of a central nervous system stimulant are the ability to increase alertness and awareness, to improve neural tone, to effect arousal and make one more aware of his environment and generally to provide a feeling of well-being. Indications that a compound or composition is in fact a central nervous system stimulant are achieved through the use of tests designed to measure increased awareness, diminished sleep time, and the like. of techniques designed to assess the stimulatory effects of a mixture of l-carvone and cis-carveol.

EXPERIMENT I — EFFECT ON BARBITURATE INDUCED SLEEP

The inhibition of barbiturate induced sleep indicates that the compound or composition may be a CNS stimulant. Male albino rats were given an anesthetic dose of barbiturate interperitoneally. Orally, prior to receiving a dose of barbiturates, another group was given cis-carveol in varying doses, and another group received a mixture of l-carvone and cis-carveol in the ratio of 1:1 parts by weight. The control group receiving only barbiturate also receives a control vehicle, such as corn oil, equal in volume to the dose of test material given to the other animals. The percent decrease of sleeptime from the control (barbiturate + vehicle) was measured with the results as follows:

| Dose of l-Carvone (mg/kg) | % Decrease of Sleeptime from Control | Dose of cis-carveol (mg/kg) | % Decrease of Sleeptime from Control | Dose of 1:1 mixture of l-Carvone and cis-carveol (mg/kg) | % Decrease of Sleeptime from Control |
| --- | --- | --- | --- | --- | --- |
| 0.1 | 6.0 | 0.05 | 2.2 | | |
| 0.2 | 5.0 | 0.10 | 33.0 | | |
| 0.5 | 58.4 | 0.2 | 49.6 | | |
| 1.0 | 54.7 | 0.50 | 52.0 | 0.2 | 55.4 |
| 1.5 | 28.4 | 1.00 | 43.4 | | |
| 3.0 | 31.8 | 3.00 | 28.2 | | |
| 5.0 | 40.5 | 6.00 | 27.5 | | |
| 20.0 | 4.0 | | | | |

The above table shows that both l-carvone and cis-carveol are effective in the inhibition of barbiturate induced sleep indicating that they are central nervous system stimulants. The optimum dosage is seen to be about 0.5 to 1.0 mg/kg for l-carvone and about 0.5 mg/kg for cis-carveol. As previously discussed, such levels of addition, i.e., about 35 mg to 70 mg for a 70 kg subject results in poor compatability with most foodstuffs as to quality and the noticeable off-flavors imparted. However, a mixture of l-carvone and cis-carveol at a 1:1 ratio by weight (0.1 mg/kg each) produced a decrease in sleeptime from the control of 55.4 percent. The combination of 0.1 mg/kg l-carvone which independently resulted in a sleep-time decrease of 6 percent and 0.1 mg/kg cis-carveol which resulted in a 33 percent decrease in sleeptime appears to have some potentiating effect resulting in a percent sleeptime decrease equivalent to their use independently at optimum dosages. The ability of this combination to act synergistically in its effects at amounts of, say, 14 mg for a 70 kg subject, greatly increases the variety of foodstuffs in which it would be compatible without affecting the flavor or quality of the foodstuff.

EXPERIMENT II — EFFECT ON PENTOBARBITOL LETHALITY

Caffeine has been known to be capable of reversing central nervous system depression as produced by sodium pentobarbitol intoxication. This experiment was designed to determine whether similar effects are achieved using a 1:1 mixture of l-carvone and cis-carveol at a dosage of 0.2 mg/kg.

Sodium pentobarbitol was administered interperitoneally at 100 mg/kg to a group of male albino mice resulting in 100 percent lethality. L-Carvone/cis-carveol at a 1:1 ratio was administered to another group of mice at a dose of 0.2 mg/kg orally. Again, the group was administered sodium pentobarbitol at 100 mg/kg. The results are as follows:

| Subject | Wt. (kg) | Dose c/c | Dose pent. | Effect |
| --- | --- | --- | --- | --- |
| 1 | .0268 | 0.2 mg/kg | 100 mg/kg | sleep |
| 2 | .0280 | | | sleep |
| 3 | .0276 | | | sleep |
| 4 | .0282 | | | sleep |
| 5 | .0224 | | | sleep |
| 6 | .0294 | | | sleep |
| 7 | .0244 | | | sleep |
| 8 | .0300 | | | dead |
| 9 | .0284 | | | sleep |
| 10 | .0314 | | | sleep |

The group of animals pretreated with l-carvone/cis-carveol orally at 0.2 mg/kg and then challenged with sodium pentobarbitol at 100 mg/kg showed that lethality was diminished down to 10 percent in the group, further indicating the effectiveness of l-carvone/cis-carveol as a central nervous system stimulant when used at low levels.

In a human clinical study, subjects were administered double blind with 1.4 mg/kg caffeine and 0.2 mg/kg of a 1:1 mixture by weight of l-carvone and cis-carveol. Measurements were made to detect shifts in arousal in the subject within the normal physiologic ranges characteristic of food product activity. Measurements were made of reaction time, that is, the the simple reaction of the dominant hand to a light flash and to a click; spectral analysis wherein an electroencephalogram is used to reflect changes in the state of arousal; and the evoked potential, a measurement of the potential evoked by a synchronous sensory input reflecting alterations in attention in a subject.

Results of these experiments indicated that the action of an l-carvone and cis-carveol mixture in producing mild stimulant effects is quantitatively similar to that of caffeine in the usual physiologic dosage.

The l-carvone/cis-carveol mixture may be incorporated within any suitable inert pharmaceutical carrier and administered in an amount effective to produce stimulatory effects. The amount of the mixture to effect stimulation is preferably in the range of from about 0.05 to about 1.0 mg/kg subject weight, and more preferably, about 0.15 to about 0.30 mg/kg. At these more preferred levels, the mixture generally produces the optimum central nervous stimulation while exhibiting a non-objectionable spearmint flavor. Use of amounts lower than 0.15 mg/kg similarly exhibit stimulation effects without any undesirable off-taste, while levels above 0.30 mg/kg, although producing effective stimulation, begin to display more undesirably strong flavor characteristics.

While the preferred ratio of components is about 1:1 by weight, combinations outside this ratio, and preferably between 5:1 and 1:5 l-carvone to cis-carveol, respectively, may also be employed.

The l-carvone/cis-carveol mixture may also be incorporated within a foodstuff to provide the desired stimulatory effects. As previously noted, the finding that a mixture of l-carvone and cis-carveol possesses stimulatory properties even at low levels, allows its use in a wide variety of foodstuffs without adversely affecting the quality or flavor of the food product. Examples of the numerous applications of such a mixture include carbonated and non-carbonated beverages, cereals, hot beverages, teas, coffees, snacks, confections, gelatin desserts, and the like. Though the compounds are liquid in the natural state, incorporation of l-carvone and cis-carveol into a dry formulation may be facilitated by use of a fixative such as edible gums or other suitable agents.

The amount of the mixture to be incorporated within the foodstuff should be such that ingestion of the foodstuff is sufficient for administering an amount of the l-carvone/cis-carveol mixture effective to produce CNS stimulation. Again, use of the mixture at levels at the higher end of the preferred range may result in the foodstuff deriving an undesirable off-taste due to the flavor of the mixture. However, masking of the strong spearmint flavor of the l-carvone/cis-carveol mixture at these levels by use of a particularly formulated foodstuff relieves such problems.

Thus, for example, formulation of a beverage drink may be such that the ingestion of, say, eight ounces of the drink, provides an amount of l-carvone/cis-carveol equivalent to about 0.15 to 0.30 mg/kg subject weight. Consideration of the class of subjects to which the foodstuff is to be directed, and other such factors, makes it possible to provide effective stimulation through ingestion of a specially formulated food product.

Also, for use in a foodstuff, the considerations of compatability with the food, that is, the levels at which offtastes are imparted by the additive, and the effective level of the mixture at which stimulatory effects are produced, may be balanced within the effective ratios of l-carvone to cis-carveol to provide the proper amount of the mixture based on the weight of the foodstuff.

The following examples are illustrative of specific embodiments of the incorporation of an l-carvone/cis-carveol mixture in a foodstuff.

EXAMPLE I

A grapefruit beverage was prepared from the following ingredients:

| | |
|---|---|
| Unsweetened Grapefruit Juice | 227 cc |
| l-Carvone/cis-carveol (1:1) | 10 cc |
| Sugar | 5.0 gms |
| Flavor | 0.02 gms |
| Salt | 0.2 gms |

The mixture was blended and placed into a chill bath. Expert tasters judged the sample to have a refreshing, mouth-cooling, stimulating effect with no noticeable spearmint of caraway after taste.

EXAMPLE II

A carbonated root beer beverage was prepared from the following ingredients:

| | |
|---|---|
| Bottler's Syrup (76.4 solids) | 50.00 gms |
| Root Beer Flavor Emulsion | 0.100 gms |
| l-Carvone/cis-carveol (1:1) | 0.014 gms |
| Carbonated water to 8 oz volume | |

The root beer beverage thus prepared was found to exhibit no foreign after tastes and was judged to possess a mouth cooling and stimulating effect.

While the invention has been described with respect to the specific embodiments above, they are intended to be illustrative only of a few of the many applications possible. Obvious variations such as the type of foodstuff, the amount of additive used, ratio of components, and the like are believed ascertainable without departing from the spirit and scope of this invention.

We claim:

1. A foodstuff containing a mixture of L-carvone and cis-carveol, said mixture in the ratio of from about 5:1 to 1:5 parts by weight of l-carvone to cis-carveol respectively and in an amount effective to produce central nervous system stimulation in a subject.

2. The foodstuff of claim 1 wherein said effective amount of said composition is sufficient for administering to said subject about 0.15 to about 0.30 milligrams of the composition for each kilogram of body weight of said subject.

3. The foodstuff of claim 1 wherein said composition is present in the ratio of about one part l-carvone to one part cis-carveol on a weight basis.

4. The foodstuff of claim 1 wherein said foodstuff is selected from the group consisting of beverages, cereals, snacks, and confections.

5. A method of producing central nervous system stimulation in a subject, which comprises orally administering to said subject an amount of a mixture of l-carvone and cis-carveol, said mixture in the ratio of from about 5:1 to 1:5 parts by weight of l-carvone to cis-carveol, respectively effective to produce said stimulation.

6. The method of claim 5 wherein said amount of said composition is about 0.2 mg/kg of body weight of said subject.

* * * * *